United States Patent
Johansson et al.

(10) Patent No.: US 10,662,820 B2
(45) Date of Patent: *May 26, 2020

(54) METHOD FOR CONTROLLING A WASTE HEAT RECOVERY SYSTEM AND SUCH A WASTE HEAT RECOVERY SYSTEM

(71) Applicant: Scania CV AB, Södertälje (SE)

(72) Inventors: Björn Johansson, Älvsjö (SE); Erik Höckerdal, Södertälje (SE); Ola Blom, Tullinge (SE)

(73) Assignee: Scania CV AB, Södertälje (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/073,026

(22) PCT Filed: Jan. 11, 2017

(86) PCT No.: PCT/SE2017/050019
§ 371 (c)(1),
(2) Date: Jul. 26, 2018

(87) PCT Pub. No.: WO2017/135865
PCT Pub. Date: Aug. 10, 2017

(65) Prior Publication Data
US 2019/0040764 A1    Feb. 7, 2019

(30) Foreign Application Priority Data

Feb. 4, 2016    (SE) ...................... 1650133

(51) Int. Cl.
*F01K 13/02*    (2006.01)
*F01K 23/06*    (2006.01)
(Continued)

(52) U.S. Cl.
CPC .......... *F01K 13/02* (2013.01); *B60W 30/192* (2013.01); *B60W 50/0097* (2013.01);
(Continued)

(58) Field of Classification Search
CPC ........ F01K 13/02; F01K 23/065; F01K 23/10; B60W 50/0097; H02K 7/1823; F01N 5/02; F05D 2220/62
(Continued)

(56) References Cited

U.S. PATENT DOCUMENTS

| 8,069,827 B2 | 12/2011 | Watanabe et al. |
| 8,881,523 B2 | 11/2014 | Kasuya et al. |

(Continued)

FOREIGN PATENT DOCUMENTS

| DE | 102015007104 A1 | 12/2015 |
| EP | 2224110 A1 | 9/2010 |

(Continued)

OTHER PUBLICATIONS

International Search Report for International Patent Application No. PCT/SE2017/050019 dated Mar. 15, 2017.
(Continued)

*Primary Examiner* — Thai Ba Trieu
*Assistant Examiner* — Dapinder Singh
(74) *Attorney, Agent, or Firm* — Moore & Van Allen PLLC; W. Kevin Ransom (57) ABSTRACT

The invention relates to a method for controlling a waste heat recovery system associated with a combustion engine of a vehicle, the waste heat recovery system comprising a working fluid circuit; at least one evaporator; an expander; a condenser; a reservoir for a working fluid and a pump arranged to pump the working fluid through the circuit, wherein the at least one evaporator is arranged for heat exchange between the working fluid and a heat source, and wherein the waste heat recovery system further comprises a cooling circuit arranged in connection to the condenser. The method comprises the steps of: predicting a shutdown of a combustion engine associated with the system; determining
(Continued)

if a predetermined requirement is fulfilled; and if so reducing the temperature in the waste heat recovery system prior to combustion engine shutdown.

18 Claims, 4 Drawing Sheets

(51) Int. Cl.
| | | |
|---|---|---|
| F02G 5/02 | (2006.01) | |
| F02G 5/00 | (2006.01) | |
| F01K 23/10 | (2006.01) | |
| B60W 30/192 | (2012.01) | |
| B60W 50/00 | (2006.01) | |

(52) U.S. Cl.
CPC ............ *F01K 23/06* (2013.01); *F01K 23/065* (2013.01); *F01K 23/10* (2013.01); *F02G 5/00* (2013.01); *F02G 5/02* (2013.01); *B60W 2510/186* (2013.01); *B60W 2520/04* (2013.01); *B60W 2550/402* (2013.01); *Y02T 10/166* (2013.01)

(58) Field of Classification Search
USPC .................................................. 60/614, 618
See application file for complete search history.

(56) References Cited

U.S. PATENT DOCUMENTS

| | | |
|---|---|---|
| 2006/0254276 A1 | 11/2006 | Sato et al. |
| 2010/0236502 A1 | 9/2010 | Watanabe et al. |
| 2012/0035829 A1 | 2/2012 | Mitani et al. |
| 2015/0308318 A1 | 10/2015 | Gibble |
| 2015/0333244 A1 | 11/2015 | Iriyama |
| 2018/0319250 A1* | 11/2018 | McQuillen ......... B60H 1/00785 |
| 2018/0320609 A1* | 11/2018 | McQuillen ............ F01N 13/008 |
| 2018/0320645 A1* | 11/2018 | McQuillen ............ F02D 41/222 |
| 2019/0003419 A1* | 1/2019 | Patel ......................... F02G 5/04 |
| 2019/0032597 A1* | 1/2019 | Johansson ................. F02G 5/02 |
| 2019/0040764 A1 | 2/2019 | Johansson et al. |

FOREIGN PATENT DOCUMENTS

| | | |
|---|---|---|
| EP | 2320058 | 9/2010 |
| EP | 2824300 A1 | 1/2015 |
| JP | 2008169809 A | 7/2008 |
| JP | 2008185001 A | 8/2008 |
| JP | 2009173124 A | 8/2009 |
| JP | 2011012625 A | 1/2011 |
| JP | 2013113192 A | 6/2013 |
| WO | WO2011037526 | 6/2013 |
| WO | WO2014049412 A1 | 4/2014 |
| WO | WO2014098843 A1 | 6/2014 |

OTHER PUBLICATIONS

Written Opinion of the International Searching Authority for International Patent Application No. PCT/SE2017/050019 dated Mar. 15, 2017.
Swedish Search Report dated Aug. 10, 2015.
SCANIA CV AB, International Patent Application No. PCT/SE2017/050019, International Preliminary Report on Patentability, dated Aug. 7, 2018.

* cited by examiner

METHOD FOR CONTROLLING A WASTE HEAT RECOVERY SYSTEM AND SUCH A WASTE HEAT RECOVERY SYSTEM

CROSS-REFERENCE TO RELATED APPLICATION(S)

This application is a National Stage Application (filed under 35 § U.S.C. 371) of PCT/SE2017/050019, filed Jan. 11, 2017 of the same title, which, in turn claims priority to Swedish Application No. 1650133-0 filed Feb. 4, 2016 of the same title; the contents of each of which are hereby incorporated by reference.

FIELD OF THE INVENTION

The present invention relates to a method for controlling a waste heat recovery system, a waste heat recovery system, a vehicle comprising such a waste heat recovery system, a computer program and a computer program product according to the appended claims.

BACKGROUND OF THE INVENTION

Vehicle manufacturers are today striving to increase engine efficiency and reduce fuel consumption. This is specifically an issue for manufacturers of heavy vehicles, such as trucks and buses. In vehicles with combustion engines some of the energy from the fuel is dissipated as heat through the exhaust pipes and the engine cooling system. By the use of a waste heat recovery system the heat from the exhaust gases may instead be used to produce mechanical work. The mechanical work may for example be transferred to the powertrain and thus be used to propel the vehicle. This way the engine efficiency and the fuel consumption may be improved.

Waste heat recovery systems are typically based on the Rankine cycle and thus comprise a working fluid, a pump for circulating the working fluid in a circuit, at least one evaporator, an expansion device and a condenser. The working fluid is suitably in a liquid state to start with. The pump pressurizes the working fluid which is pumped through the evaporator. The working fluid is heated by the exhaust gases lead through the evaporator and the working fluid thereby evaporates. The vapour is subsequently expanded in the expansion device. By means of the expansion device the recovered heat is converted into mechanical work. The vapour is thereafter cooled in the condenser, such that the working fluid is brought back to its initial liquid state. The condenser is thus typically connected to a cooling circuit, which could be part of the engine cooling system or a separate cooling system.

The operating temperature of such a waste heat recovery system is normally quite high and the thermal inertia of the system results in a high temperature even after the system has been shut down. Too high temperatures could damage the working fluid and other components of the waste heat recovery system. It is therefore important that the waste heat recovery system is cooled down before being shut down.

Document WO 2014/098843 A1 describes a method for operating a waste heat recovery system where a shutoff valve is arranged at the inlet side to the pump, such that the circulation of the working fluid may be stopped in the event an emergency shutdown is needed. Such emergency shutdown of the waste heat recovery system may be needed for example during engine braking, malfunction of the system or when the vehicle is stopped with the engine running for inspection or service.

SUMMARY OF THE INVENTION

Despite known solutions in the field, there is still a need to develop a method for controlling a waste heat recovery system, which optimizes engine efficiency, fuel consumption and driver comfort.

An object of the present invention is to achieve an advantageous method for controlling a waste heat recovery system, which optimizes engine efficiency and fuel consumption.

Another object of the present invention is to achieve an advantageous method for controlling a waste heat recovery system, which optimizes driver comfort.

Another object of the invention is to achieve an advantageous waste heat recovery system, which optimizes engine efficiency and fuel consumption.

A further object of the invention is to achieve an advantageous waste heat recovery system, which optimizes driver comfort.

The herein mentioned objects are achieved by a method for controlling a waste heat recovery system, a waste heat recovery system, a vehicle, a computer program and a computer program product according to the independent claims.

According to an aspect of the present invention a method for controlling a waste heat recovery system associated with a combustion engine of a vehicle is provided. The waste heat recovery system comprises a working fluid circuit; at least one evaporator; an expander; a condenser; a reservoir for a working fluid and a pump arranged to pump the working fluid through the circuit, wherein the at least one evaporator is arranged for heat exchange between the working fluid and a heat source, and wherein the waste heat recovery system further comprises a cooling circuit arranged in connection to the condenser. The method comprises the steps of:

predicting a shutdown of a combustion engine associated with the system;

determining if a predetermined requirement is fulfilled; and if so reducing the temperature in the waste heat recovery system prior to combustion engine shutdown.

The waste heat recovery system of the invention is suitably based on the Rankine cycle, preferably an organic Rankine cycle. The working fluid is thus suitably organic, such as ethanol or R245fa. The waste heat recovery system based on the Rankine cycle is suitably configured such that the working fluid, suitably in a liquid state, is pumped through the at least one evaporator. The working fluid is thereby heated by the heat source connected to the evaporator and the working fluid thus evaporates. The vapour is then expanded in the expander whereby mechanical work is produced. The mechanical work may for example be transferred to the crankshaft of the combustion engine and thus be used to propel the vehicle, or the mechanical work may be used to drive for example a generator. The vapour is thereafter cooled in the condenser by heat exchange with a cooling fluid in the cooling circuit, such that the working fluid is brought back to its initial liquid state. The heat source connected to the at least one evaporator may be exhaust gases from the combustion engine, an exhaust gas recirculation system, the cooling fluid of the combustion engine, the combustion engine itself or any other hot component in the vehicle. The heat source is preferably associated with the combustion engine. The at least one evaporator is suitably a heat exchanger connected to the heat source and the working fluid circuit. The heat transfer between the working fluid and the heat source is an exchange of energy resulting in a change in temperature. Thus, the heat source is providing the energy entering the waste heat recovery system and the energy is leaving the waste heat recovery system as mechanical work via the expander and as heat via the cooling circuit. The temperature in the waste heat recovery system thus depends on the amount of energy entering the system and the amount of energy leaving the system. The waste heat recovery system may comprise a plurality of evaporators, each connected to a separate heat source.

The operating temperature of the waste heat recovery system is normally quite high and the thermal inertia of the system results in a high temperature long after the system has been shut down. Such high temperatures could damage the working fluid and other components of the waste heat recovery system. It is therefore important that the waste heat recovery system is cooled down before the system is shut down. It is thus crucial that circulation of the working fluid and the cooling fluid is maintained until a safe temperature is reached. The waste heat recovery system is typically operating mainly when the combustion engine is operating since the heat source generally is associated with the combustion engine. Thus, the waste heat recovery system is commonly shut down when the combustion engine is turned off. The waste heat recovery system may for example be shut down by turning off the pump circulating the working fluid. When the combustion engine is turned off, the heat source may no longer heat the evaporator but the thermal inertia of the evaporator means that the evaporator will maintain a very high temperature for a certain time. If the waste heat recovery system is immediately shut down as the combustion engine is turned off, the high temperature of the evaporator may damage components of the waste heat recovery system. The temperature of the waste heat recovery system therefore needs to be reduced before being shut down. However, the efficiency of the waste heat recovery system is increased with evaporator temperature. The temperature of the evaporator should therefore be maintained as high as possible during normal operation and the waste heat recovery system should thus not be unnecessarily cooled down. By predicting a combustion engine shutdown, determining if a predetermined requirement is fulfilled and reducing the temperature in the waste heat recovery system prior to engine shutdown if the requirement is fulfilled, it is ensured that the waste heat recovery system is cooled down only when necessary. The waste heat recovery system is thereby only cooled down when it is likely that the waste heat recovery system will be shut down. By predicting an engine shutdown and determining if a predetermined requirement is fulfilled, a shutdown of the waste heat recovery system is also predicted. The waste heat recovery system may thereby be cooled down prior to combustion engine shutdown and the waste heat recovery system may be shut down at the same time as the engine shutdown. A method for controlling a waste heat recovery system is thereby achieved, which optimizes engine efficiency, fuel consumption and driver comfort.

The cooling circuit connected to the condenser may be part of the combustion engine cooling system or a separate cooling system. The cooling fluid cooling the condenser may thereby be circulated in the cooling circuit by a cooling pump, driven by the combustion engine or by an electric machine. In the case where the cooling pump is driven by the combustion engine it is crucial that the waste heat recovery system is cooled down prior to engine shutdown, since the cooling pump will stop circulating the cooling fluid when the combustion engine is turned off. If the condenser is not cooled by the cooling circuit, the working fluid in the waste heat recovery system will not be cooled and reducing the temperature in the waste heat recovery system will be difficult. In the case where the cooling pump is driven by an electric machine the waste heat recovery system may be cooled down after engine shutdown. However, the driver will then have to wait until the waste heat recovery system has reached a sufficiently low temperature to be safely shut down. Also, if the waste heat recovery system is cooled down after engine shutdown, the electric machine driving the cooling pump will use energy from an energy storage such as a battery in the vehicle. This is not advantageous. By reducing the temperature in the waste heat recovery system prior to engine shutdown the electric machine driving the cooling pump will instead use energy from a generator, which will increase the lifetime of the battery. Also, by reducing the temperature in the waste heat recovery system prior to engine shutdown, the driver comfort is increased since the waste heat recovery system may be shut down essentially at the same time as the combustion engine.

The waste heat recovery system may comprise one or more evaporators/heat exchangers. The waste heat recovery system may for example comprise a recuperator arranged to pre-heat the working fluid before entering the evaporator. The waste heat recovery system may also comprise one or more condensers, such that cooling of the working fluid may be performed in multiple steps. Furthermore, the system may comprise one or more expanders. The expander may be a turbine or a piston expander.

The waste heat recovery system may be associated with a combustion engine of a hybrid vehicle. Such hybrid vehicle comprises an electric machine for propulsion, in addition to the combustion engine.

The method steps are suitably performed by means of a control unit connected to the at least one evaporator, the expander, the condenser and the pump. The predetermined requirement is suitably associated with the prediction of the combustion engine shutdown and thus the prediction of a waste heat recovery system shutdown. The predetermined requirement is suitably a vehicle operation requirement. The predetermined requirement is suitably stored in the control unit.

According to an aspect of the invention the combustion engine shutdown is predicted based on that a vehicle comprising the combustion engine is standing still. The predetermined requirement then suitably comprises that a parking brake in the vehicle is activated. When the vehicle is standing still, there is a possibility that the combustion engine and thus the waste heat recovery system will be turned off and it might therefore be advantageous to reduce the temperature in the waste heat recovery system. However, when the vehicle is stopped at a stop sign or a traffic light the combustion engine is not necessarily turned off and the temperature of the waste heat recovery system should therefore not be reduced in order to maintain a high temperature in the evaporator. If, however, the parking brake of the vehicle is activated while the vehicle stands still there is a high probability that the combustion engine and thus the waste heat recovery system will be turned off. By reducing the temperature in the waste heat recovery system only when the parking brake is activated it is ensured that the efficiency of the waste heat recovery system is optimized and the engine efficiency and the fuel consumption is thereby optimized.

According to an aspect of the invention the combustion engine shutdown is predicted based on the topography of the planned vehicle route. It may, for example, be desirable to turn off the combustion engine when going downhill and the waste heat recovery system may then be shut down. The predetermined requirement is thus that the vehicle is at a predetermined time or distance from a future downhill.

According to an aspect of the invention the combustion engine shutdown is predicted based on the final destination of a vehicle comprising the combustion engine. The final destination of the vehicle is suitably determined by means of a navigation system. The predetermined requirement thereby comprises that the vehicle is within a predetermined distance or time from the final destination. The predetermined requirement may comprise that the vehicle is between 1-3 minutes from the final destination. It is very probable that the combustion engine will be turned off when the vehicle has reached its final destination. By pre-emptively reducing the temperature in the waste heat recovery system when the vehicle is close to the final destination the waste heat recovery system will be ready for shutdown at the time of combustion engine shutdown. This way, a method for controlling a waste heat recovery system is achieved, which optimizes driver comfort.

According to an aspect of the invention the combustion engine shutdown is predicted based on the next required stop of a vehicle comprising the combustion engine. The next required stop of the vehicle is suitably determined by means of a tachograph. The next required stop is determined based on how long the driver has been active and is thus the time or position where the driver must rest. The predetermined requirement then comprises that the vehicle is within a predetermined distance or time from the next required stop. The predetermined requirement may comprise that the vehicle is between 1-3 minutes from the next required stop. It is very probable that the combustion engine will be turned off at the next required stop. By pre-emptively reducing the temperature in the waste heat recovery system when the vehicle is close to the next required stop the waste heat recovery system will be ready for shutdown at the time of combustion engine shutdown. This way, a method for controlling a waste heat recovery system is achieved, which optimizes driver comfort.

Alternatively, the combustion engine shutdown may be predicted based on a different vehicle system requesting engine shutdown. This may be advantageous in the case where the vehicle comprising the waste heat recovery system is a hybrid vehicle. For example, in order to avoid noise and emissions it may be desirable to turn off the combustion engine and propel the vehicle with the electric machine. In this case, the combustion engine may be turned off and the waste heat recovery system is not needed. The method thus comprises to reduce the temperature in the waste heat recovery system prior to combustion engine shutdown when a different vehicle system requests combustion engine shutdown.

According to an aspect of the invention the predetermined requirement comprises that a vehicle comprising the combustion engine is operating in a specific vehicle performance mode, such as an economy mode, a normal mode or a power mode. Depending on the vehicle performance mode different aspects are considered when controlling the vehicle. For example, a vehicle operating in an economy mode is controlled such that the fuel consumption is minimized and a vehicle operating in a power mode is controlled such that the engine power is maximized. This is suitably considered when determining whether the waste heat recovery system should be cooled down based on a predicted engine shutdown or not. When operating in an economy mode the fuel consumption should be minimized and the temperature in the waste heat recovery system should therefore be preserved as long as possible. In order to maximize the engine power in a power mode the temperature of the waste heat recovery system should also be preserved as long as possible. The temperature of the waste heat recovery system may thus be pre-emptively reduced based on a predicted engine shutdown only in the case where the vehicle performance mode is a normal mode.

According to an aspect of the invention the predetermined requirement comprises that the current temperature in the system is above a critical temperature. If the temperature in the waste heat recovery system is not too high, there is no need to reduce the temperature further prior to combustion engine shutdown. Thus, the temperature in the waste heat recovery system is reduced only when the current temperature in the waste heat recovery system is above a critical temperature. The critical temperature may be between 100-150 degrees Celsius.

According to an aspect of the invention the step to reduce the temperature in the waste heat recovery system comprises to control the cooling circuit connected to the condenser. By controlling the cooling circuit connected to the condenser the amount of energy leaving the waste heat recovery system through the cooling circuit may be increased and the temperature in the waste heat recovery system is thereby reduced. The cooling circuit may be controlled such that the flow of cooling fluid through the condenser is increased and/or by reducing the temperature of the cooling fluid. In addition or alternatively, the temperature in the waste heat recovery system is reduced by controlling the heat source connected to the at least one evaporator. The heat source is suitably controlled such that less heat is exchanged through the evaporator. The temperature of the evaporator is thereby reduced and the heat transfer to the working fluid is reduced. The heat source is suitably controlled such that it is bypassing the evaporator. This way, the amount of energy entering the waste heat recovery system may be reduced and the temperature in the waste heat recovery system is thereby reduced. In the case where the heat source is exhaust gases from the combustion engine, the step to reduce the temperature in the waste heat recovery system may comprise to control the exhaust gases such that they bypass the evaporator.

According to an aspect of the invention the step to reduce the temperature in the system comprises to reduce the temperature, such that a target temperature is reached, wherein the target temperature is below a normal operation temperature. The target temperature is suitably a temperature desired for enabling a safe shutdown of the waste heat recovery system. During normal operation of the waste heat recovery system, the waste heat recovery system is typically controlled to maintain a certain normal operation temperature. When a combustion engine shutdown has been predicted and the predetermined requirement is fulfilled, the temperature in the waste heat recovery system is reduced to a target temperature lower than the normal operation temperature. This way, the waste heat recovery system is cooled down such that it can be safely shut down at the time of combustion engine shutdown. The target temperature and the normal operation temperature are suitably associated with the working fluid immediately downstream of the evaporator or immediately downstream of the condenser. The waste heat recovery system is thus suitably controlled such that the working fluid has a normal operation temperature during normal operation and such that the working fluid reaches a target temperature prior to shutdown of the waste heat recovery system.

The target temperature is suitably below the normal operation temperature, and substantially corresponds to the critical temperature defined above. Therefore, the critical temperature may be between 100-150 degrees Celsius. The target temperature is suitably a temperature desired for enabling a safe shutdown of the waste heat recovery system. The normal operation temperature in the waste heat recovery system is preferably between 200-300 degrees Celsius, and depends on the type of working fluid in the waste heat recovery system.

According to an aspect of the present invention a waste heat recovery system associated with a combustion engine of a vehicle is provided. The waste heat recovery system comprises a working fluid circuit; at least one evaporator; an expander a condenser; a reservoir for a working fluid and a pump arranged to pump the working fluid through the circuit, wherein the at least one evaporator is arranged for heat exchange between the working fluid and a heat source, and wherein the waste heat recovery system further comprises a cooling circuit arranged in connection to the condenser. The waste heat recovery system comprises a control unit adapted to predict a shutdown of a combustion engine associated with the system; determine if a predetermined requirement is fulfilled; and if so reducing the temperature in the waste heat recovery system prior to combustion engine shutdown.

The control unit is suitably connected to the at least one evaporator, the expander, the pump and the cooling circuit. The control unit may be the engine control unit or may comprise a plurality of different control units. A computer may be connected to the control unit.

The control unit is suitably adapted to predict the combustion engine shutdown based on that a vehicle comprising the combustion engine is standing still. The control unit may be adapted to determine if the vehicle is standing still based on signals from sensor devices connected to the driving wheels of the vehicle. The control unit may be adapted to determine if the vehicle is standing still by determining engine speed. The engine speed is suitably an idling speed when the vehicle stands still. The control unit is further adapted to determine whether the parking brake of the vehicle is activated or not.

The control unit is suitably adapted to predict the combustion engine shutdown based on the final destination of a vehicle comprising the combustion engine. The control unit suitably determines the final destination by means of signals from a navigation system. The control unit is further adapted to determine when the vehicle is within a predetermined distance or time from the final destination.

The control unit is suitably adapted to predict the combustion engine shutdown based on the next required stop of a vehicle comprising the combustion engine. The control unit suitably determines the next required stop by means of signals from a tachograph. The control unit is further adapted to determine when the vehicle is within a predetermined distance or time from the next required stop.

The control unit is adapted to control the cooling circuit of the condenser in order to reduce the temperature in the system prior to combustion engine shutdown. The control unit may be adapted to increase the flow of cooling fluid through the condenser and/or to reduce the temperature of the cooling fluid.

The control unit is suitably adapted to control the heat source connected to the at least one evaporator in order to reduce the temperature in the system prior to engine shutdown. The control unit may be adapted to control the heat source such that the heat source is bypassing the at least one evaporator.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION OF THE INVENTION

Figure 1:
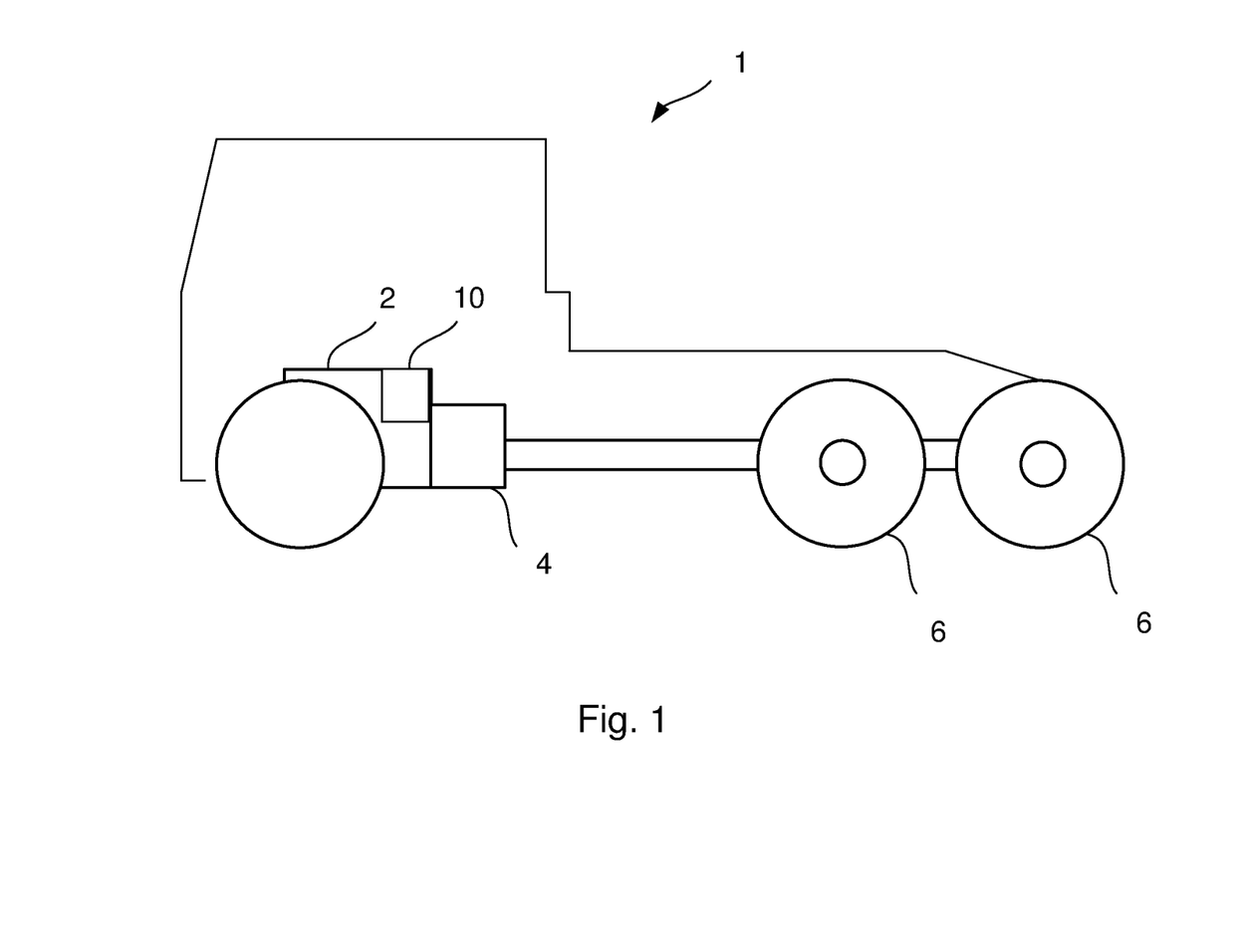
FIG. 1 schematically illustrates a vehicle according to an embodiment of the invention.

FIG. 1 schematically shows a side view of a vehicle 1 according to an embodiment of the invention. The vehicle 1 comprises a combustion engine 2 and a waste heat recovery system 10 associated with the combustion engine 2. The vehicle 1 further comprises a gearbox 4 connected to the driving wheels 6 of the vehicle 1. The vehicle 1 may be a heavy vehicle, e.g. a truck or a bus. The vehicle 1 may alternatively be a passenger car. The vehicle may be a hybrid vehicle comprising an electric machine (not shown) in addition to the combustion engine 2.

Figure 2:
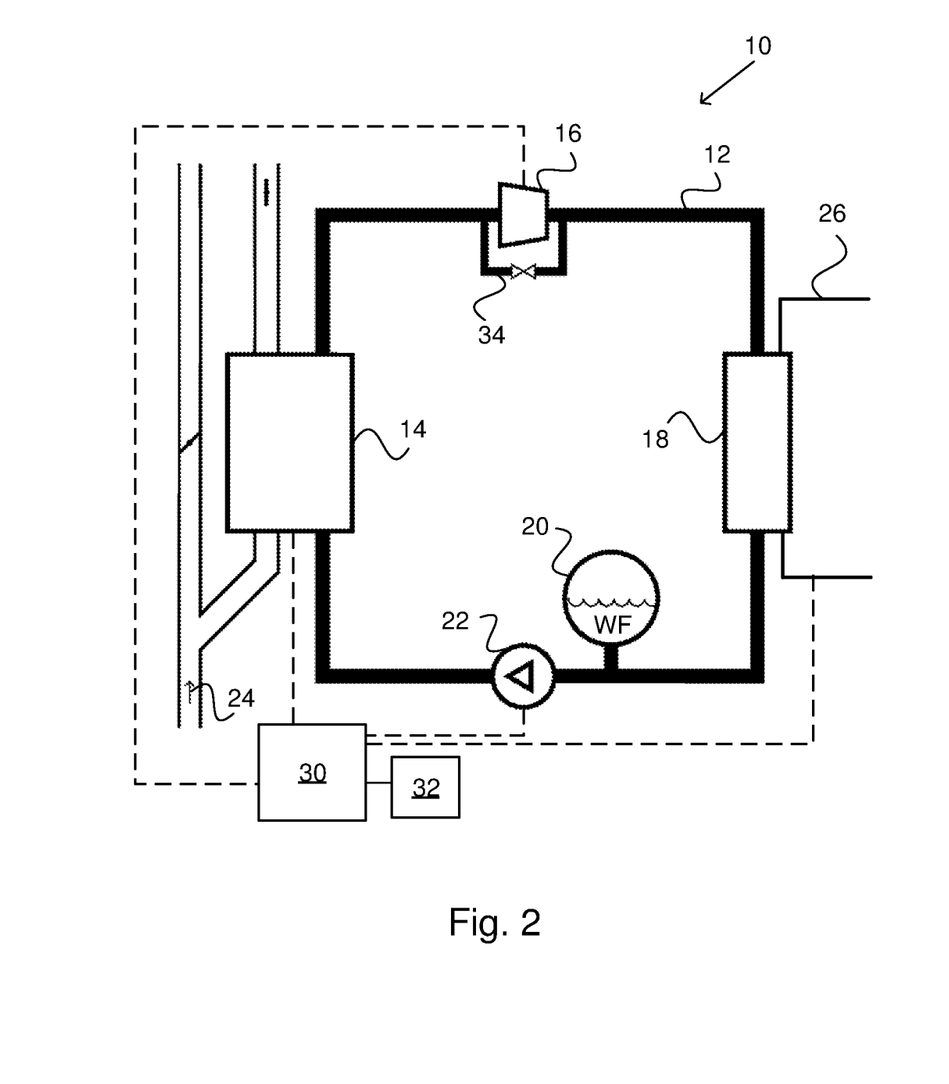
FIG. 2 schematically illustrates a waste heat recovery system according to an embodiment of the invention.

FIG. 2 schematically shows a waste heat recovery system 10 associated with a combustion engine 2 of a vehicle 1 according to an embodiment of the invention. The vehicle 1 is suitably configured as described in FIG. 1. The waste heat recovery system 10 comprises a working fluid circuit 12; at least one evaporator 14; an expander 16; a condenser 18; a reservoir 20 for a working fluid WF and a pump 22 arranged to pump the working fluid WF through the circuit 12, wherein the evaporator 14 is arranged for heat exchange between the working fluid WF and a heat source 24, and wherein the waste heat recovery system 10 further comprises a cooling circuit 26 arranged in connection to the condenser 18. The waste heat recovery system 10 comprises a control unit 30 adapted to predict a shutdown of a combustion engine 2 associated with the system 10; determine if a predetermined requirement is fulfilled; and if so reducing the temperature in the waste heat recovery system 10 prior to combustion engine shutdown.

The control unit 30 is arranged in connection to the evaporator 14, the expander 16, the cooling circuit 26 and the pump 22. A computer 32 may be connected to the control unit 30. The predetermined requirement is suitably stored in the control unit 30. The control unit 30 is adapted to predict a combustion engine shutdown based on various vehicle operation data. The control unit 30 is adapted to reduce the temperature in the waste heat recovery system 10 by controlling the cooling circuit 26 and/or controlling the heat source 24 connected to the evaporator 14.

The heat source 24 connected to the evaporator 14 may be exhaust gases from the combustion engine 2, an exhaust gas recirculation system (EGR), the cooling fluid of the combustion engine 2, the combustion engine 2 itself or any other hot component associated with the combustion engine 2. The heat source 24 is herein illustrated as a medium passing through the evaporator 14. The heat source 24 is herein illustrated as arrows and may be exhaust gases from the combustion engine 2.

The waste heat recovery system 10 may comprise a plurality of evaporators 14, each connected to a different heat source 24. The evaporator 14 is suitably a heat exchanger connected to the heat source 24 and the working fluid circuit 12. The heat transfer between the working fluid WF and the heat source 24 is an exchange of energy resulting in a change in temperature.

The waste heat recovery system 10 is suitably based on an organic Rankine cycle. The working fluid WF is thus suitably organic, such as ethanol or R245fa. The waste heat recovery system 10 is thus configured such that the liquid working fluid WF is pumped from low pressure to high pressure and enters the evaporator 14. The working fluid WF is thereby heated by the heat source 24 connected to the evaporator 14 and the working fluid WF is thus evaporated. The vapour is then expanded in the expander 16 whereby mechanical work is produced and the temperature and the pressure of the vapour is decreased. The mechanical work may for example be transferred to the crankshaft of the combustion engine 2 and thus be used to propel the vehicle 1 or the mechanical work may be used to drive for example a generator. The vapour thereafter enters the condenser 18 where condensation through heat exchange between the vapour and the cooling fluid of the cooling circuit 26 brings the working fluid WF back to its initial liquid state.

Thus, the heat source 24 is providing the energy entering the waste heat recovery system 10 and the energy is leaving the waste heat recovery system 10 as mechanical work via the expander 16 and as heat via the cooling circuit 26 cooling the condenser 18. The temperature in the waste heat recovery system 10 thus depends on the amount of energy entering the system 10 and the amount of energy leaving the system 10.

It is crucial that the waste heat recovery system 10 is cooled down before being shut down. The thermal inertia of for example the evaporator 14 will otherwise cause a high temperature in the waste heat recovery system 10 after shutdown. A too high temperature in the waste heat recovery system 10 may damage the working fluid WF and other components of the waste heat recovery system 10. Only vapour should enter the expander 16 and the waste heat recovery system 10 therefore comprises a bypass arrangement 34, such that in the case where the working fluid WF is still in a liquid state downstream of the evaporator 14, the working fluid WF is bypassing the expander 16 through the bypass arrangement 34.

The pump 22 pressurizing and circulating the working fluid WF through the circuit 12 may be damaged if the working fluid WF entering the pump 22 is not in a liquid state. Thus in the case where the temperature downstream of the condenser 18 is too high, such that the working fluid WF is not in a liquid state, the pressure in the reservoir 20 may be increased. This way, the working fluid WF is brought to a liquid state and may be pumped by the pump 22. The pump 22 is suitably electrically driven.

The cooling circuit 26 connected to the condenser 18 may be part of the combustion engine cooling system or a separate cooling system. The cooling fluid in the cooling circuit 26 may thereby be pumped by a cooling pump (not shown) driven by the combustion engine 2 or by an electric machine (not shown). In the case where the cooling pump is driven by the combustion engine 2 it is important that the waste heat recovery system 10 is cooled down prior to engine shutdown, since the cooling pump will stop working when the combustion engine 2 is turned off. If the condenser 18 is not cooled by the cooling circuit 26, the working fluid WF in the waste heat recovery system 10 will not be cooled and reducing the temperature in the waste heat recovery system 10 will be difficult. In the case where the cooling pump is driven by an electric machine the waste heat recovery system 10 may be cooled down after engine shutdown. However, the driver will then have to wait until the waste heat recovery system 10 has reached a sufficiently low temperature to be safely shut down. Also, if the waste heat recovery system 10 is cooled down after engine shutdown, the electric machine driving the cooling pump will use energy from an energy storage such as a battery in the vehicle 1. This is not advantageous. By reducing the temperature in the waste heat recovery system 10 prior to engine shutdown the electric machine driving the cooling pump will instead use energy from a generator, which will increase the lifetime of the battery. Also, by reducing the temperature in the waste heat recovery system 10 prior to engine shutdown, the driver comfort is increased since the waste heat recovery system 10 may be shut down essentially at the same time as the combustion engine 2.

The waste heat recovery system 10 may comprise one or more heat exchangers. The waste heat recovery system 10 may for example comprise a recuperator arranged to preheat the working fluid WF before entering the evaporator 14. The waste heat recovery system 10 may also comprise one or more condensers 18, such that cooling down of the working fluid WF may be performed in multiple steps. Furthermore, the system 10 may comprise one or more expanders 16. The expander 16 may be a turbine or a piston expander.

Figure 3:
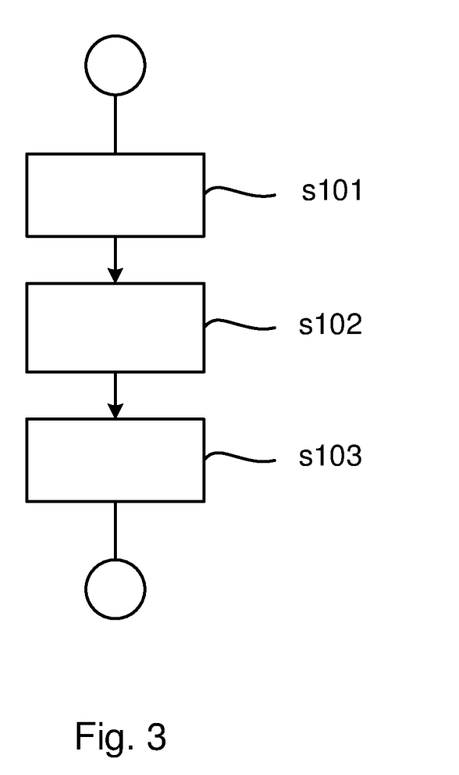
FIG. 3 schematically illustrates a flow chart for a method for controlling a waste heat recovery system according to an embodiment of the invention.

FIG. 3 shows a flowchart for a method for controlling a waste heat recovery system 10 associated with a combustion engine 2 of a vehicle 1. The waste heat recovery system 10 is suitably configured as described in FIG. 2. The waste heat recovery system 10 thus comprises a working fluid circuit 12; at least one evaporator 14; an expander 16; a condenser 18; a reservoir 20 for a working fluid WF and a pump 22 arranged to pump the working fluid WF through the circuit 12, wherein the evaporator 14 is arranged for heat exchange between the working fluid WF and a heat source 24, and wherein the waste heat recovery system 10 further comprises a cooling circuit 26 arranged in connection to the condenser 18. The method comprises the steps of:

predicting s101 a shutdown of a combustion engine 2 associated with the system 10;

determining s102 if a predetermined requirement is fulfilled; and if so reducing s103 the temperature in the waste heat recovery system 10 prior to combustion engine shutdown.

The waste heat recovery system 10 associated with the combustion engine 2 is typically activated mainly when the combustion engine 2 is operating. Thus, the waste heat recovery system 10 is commonly shut down when the combustion engine 2 has been turned off. When the combustion engine 2 is turned off, the heat source 24 may no longer heat the evaporator 14 but the thermal inertia of the evaporator 14 means that the evaporator 14 will maintain a very high temperature for a certain time. If the waste heat recovery system 10 is immediately shut down as the combustion engine 2 is turned off, the high temperature of the evaporator 14 may damage the working fluid WF and other components of the waste heat recovery system 10. The temperature in the waste heat recovery system 10 therefore needs to be reduced before the system 10 is shut down. However, the efficiency of the waste heat recovery system 10 is increased with the temperature of the evaporator 14. The temperature of the evaporator 14 should therefore be maintained as high as possible during normal operation. The waste heat recovery system 10 should thus not be unnecessarily cooled down. By performing the method steps it is ensured that the waste heat recovery system 10 is cooled down only when necessary. A method for controlling a waste heat recovery system 10 is thereby achieved, which optimizes engine efficiency and fuel consumption. By predicting an engine shutdown and determining if a predetermined requirement is fulfilled a shutdown of the waste heat recovery system 10 is predicted. The waste heat recovery system 10 may thereby be cooled down prior to combustion engine shutdown and the waste heat recovery system 10 may be shut down essentially at the same time as the engine shutdown.

The prediction of a combustion engine shutdown is suitably based on that a vehicle 1 comprising the combustion engine 2 is standing still. The predetermined requirement then suitably comprises that a parking brake in the vehicle 1 is activated. By reducing the temperature in the waste heat recovery system 10 only when the parking brake is activated, and thus only when it is very likely that the waste heat recovery system should be shut down, it is ensured that the efficiency of the waste heat recovery system 10 is optimized and the engine efficiency and the fuel consumption is thereby optimized.

The prediction of a combustion engine shutdown is suitably based on the final destination of a vehicle 1 comprising the combustion engine 2. The final destination of the vehicle 1 is suitably determined by means of a navigation system. The predetermined requirement may comprise that the vehicle 1 is within a predetermined distance or time from the final destination. The predetermined requirement may comprise that the vehicle 1 is between 1-3 minutes from the final destination, which may correspond to a distance corresponding to said period in time. It is very probable that the combustion engine 2 will be turned off when the vehicle 1 has reached its final destination. It is thus also very probable that the waste heat recovery system 10 will be shut down at the final destination. By pre-emptively reducing the temperature in the waste heat recovery system 10 when the vehicle 1 is close to the final destination the waste heat recovery system 10 will be ready for shutdown at the time of combustion engine shutdown. This way, a method for controlling a waste heat recovery system is achieved, which optimizes driver comfort.

The prediction of a combustion engine shutdown is suitably based on the next required stop of a vehicle 1 comprising the combustion engine 2. The next required stop of the vehicle 1 is suitably determined by means of a tachograph. The next required stop is determined based on how long the driver has been active and is thus the time or position where the driver must rest. The predetermined requirement may thus comprise that the vehicle 1 is within a predetermined distance or time from the next required stop. The predetermined requirement may comprise that the vehicle is between 1-3 minutes from the next required stop. It is very probable that the combustion engine 2 and thus the waste heat recovery system 10 will be turned off at the next required stop. By pre-emptively reducing the temperature in the waste heat recovery system 10 when the vehicle 1 is close to the next required stop the waste heat recovery system 10 will be ready for shutdown at the time of combustion engine shutdown. This way, a method for controlling a waste heat recovery system is achieved, which optimizes driver comfort.

Alternatively, the combustion engine shutdown may be predicted based on a different vehicle system requesting engine shutdown. This may be advantageous in the case where the vehicle 1 comprising the waste heat recovery system 10 is a hybrid vehicle. For example, in order to avoid noise and emissions it may be desirable to turn off the combustion engine 2 and propel the vehicle 1 with the electric machine. In this case, the combustion engine 2 may the turned off and the waste heat recovery system 10 is not needed.

The predetermined requirement suitably comprises that a vehicle 1 comprising the combustion engine 2 is operating in a specific vehicle performance mode, such as an economy mode, a normal mode or a power mode. Depending on the vehicle performance mode different aspects are considered when controlling the vehicle 1. When operating in an economy mode the fuel consumption should be minimized and the temperature in the waste heat recovery system 10 should therefore be preserved as long as possible. In order to maximize the engine power in a power mode the temperature of the waste heat recovery system 10 should also be preserved as long as possible. The temperature of the waste heat recovery system 10 is thus suitably only reduced based on a predicted engine shutdown in the case where the vehicle performance mode is a normal mode.

The predetermined requirement suitably comprises that the current temperature in the waste heat recovery system 10 is above a predetermined critical temperature. If the temperature in the waste heat recovery system 10 is not too high, there is no need to reduce the temperature further prior to engine shutdown. Thus, the temperature in the waste heat recovery system 10 is reduced only when the current temperature in the waste heat recovery system 10 is above a predetermined critical temperature. The predetermined critical temperature may be between 100-150 degrees Celsius.

The step to reduce s103 the temperature in the waste heat recovery system 10 suitably comprises to control the cooling circuit 26 connected to the condenser 18. By controlling the cooling circuit 26 connected to the condenser 18 the amount of energy leaving the waste heat recovery system 10 through the cooling circuit 26 may be increased and the temperature in the waste heat recovery system 10 is thereby reduced. The cooling circuit 26 may be controlled such that the flow of cooling fluid through the condenser 18 is increased and/or such that the temperature of the cooling fluid is reduced. In addition or alternatively, the step to reduce s103 the temperature in the waste heat recovery system 10 comprises to control the heat source 24 connected to the evaporator 14. The heat source 24 is suitably controlled such that it is bypassing the evaporator 14. The temperature of the evaporator 14 is thereby reduced and the heat transfer to the working fluid WF is reduced. This way, the amount of energy entering the waste heat recovery system 10 may be reduced and the temperature in the waste heat recovery system 10 is thereby reduced.

The step to reduce s103 the temperature in the waste heat recovery system 10 suitably comprises to reduce the temperature, such that a target temperature is reached, wherein the target temperature is below a normal operation temperature. The target temperature is suitably a temperature desired to safely shut down the waste heat recovery system 10. When a combustion engine shutdown has been predicted and the predetermined requirement is fulfilled the temperature in the waste heat recovery system 10 is suitably reduced to a target temperature lower than the normal operation temperature. This way, the waste heat recovery system 10 is cooled down such that it can be safely shut down at the time of engine shutdown. The target temperature and the normal operation temperature are suitably associated with the working fluid WF immediately downstream of the evaporator 14 or immediately downstream of the condenser 18. The temperature of the working fluid WF immediately downstream of the condenser 18 may be determined by the temperature in the cooling circuit 26. The waste heat recovery system 10 is thus suitably controlled such that the working fluid WF has a normal operation temperature during normal operation and such that the working fluid WF reaches a target temperature prior to shutdown of the waste heat recovery system 10.

Figure 4:
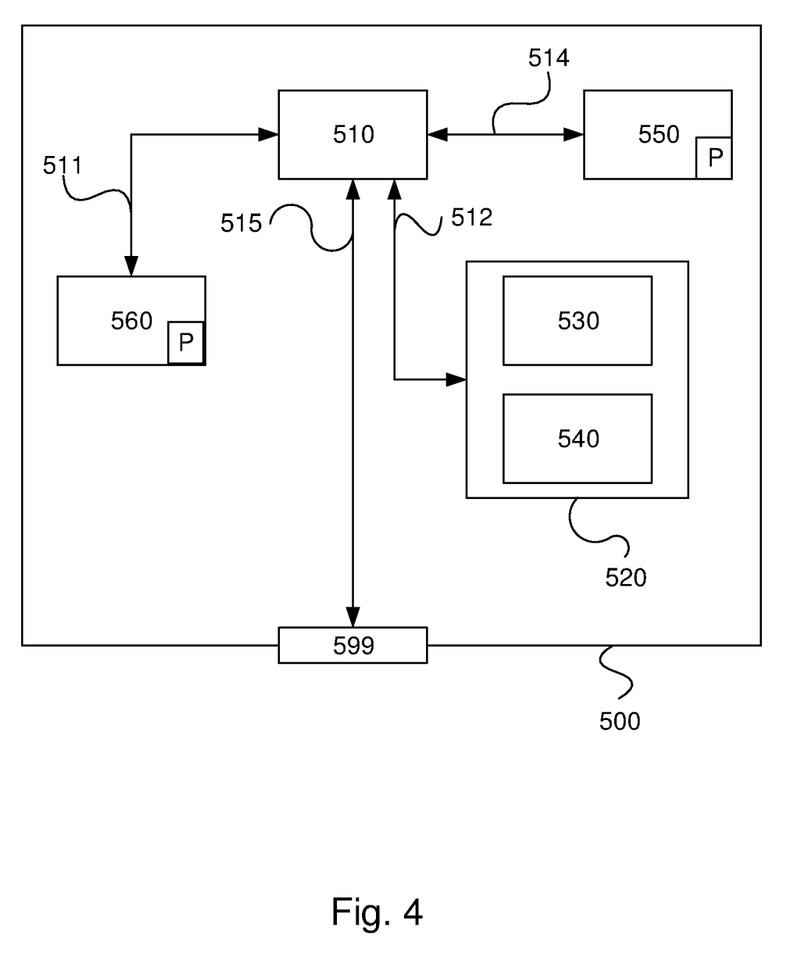
FIG. 4 schematically illustrates a control unit or computer according to an embodiment of the invention.

FIG. 4 schematically illustrates a device 500. The control unit 30 and/or computer 32 described with reference to FIG. 2 may in a version comprise the device 500. The term "link" refers herein to a communication link which may be a physical connection such as an optoelectronic communication line, or a non-physical connection such as a wireless connection, e.g. a radio link or microwave link. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P which comprises routines for a method for controlling a waste heat recovery system 10 associated with a combustion engine 2 of a vehicle 1 according to the invention. The computer program P comprises routines for predicting a combustion engine shutdown of a combustion engine 2 associated with the waste heat recovery system 10. The computer program P comprises routines for determining if a predetermined requirement is fulfilled. The computer program P comprises routines for reducing the temperature in the waste heat recovery system 10 if the predetermined requirement is fulfilled. The program P may be stored in an executable form or in a compressed form in a memory 560 and/or in a read/write memory 550.

Where the data processing unit 510 is described as performing a certain function, it means that the data processing unit 510 effects a certain part of the program stored in the memory 560 or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method for controlling a waste heat recovery system associated with a combustion engine of a vehicle, the waste heat recovery system comprising a working fluid circuit; at least one evaporator; an expander; a condenser; a reservoir for a working fluid and a pump arranged to pump the working fluid through the working fluid circuit, wherein the at least one evaporator is arranged for heat exchange between the working fluid and a heat source, and wherein the waste heat recovery system further comprises a cooling circuit arranged in connection to the condenser, wherein said method comprises, via at least one control unit:
monitoring, via at least one sensor, at least one of a current operation and an expected operation of the combustion engine associated with the waste heat recovery system;
predicting a future shutdown of the combustion engine, based on said monitored at least one of the current operation and the expected operation;
determining if a predetermined requirement is fulfilled after predicting the future shutdown of the combustion engine; and if so
reducing a temperature in the waste heat recovery system prior to combustion engine shutdown.

2. The method according to claim 1, wherein predicting the combustion engine shutdown is based on a determination that the vehicle comprising the combustion engine is standing still.

3. The method according to claim 2, wherein determining a predetermined requirement is fulfilled comprises determining that a parking brake in the vehicle is activated.

4. The method according to claim 1, wherein predicting the combustion engine shutdown is based on the final destination of the vehicle comprising the combustion engine.

5. The method according to claim 4, wherein the predetermined requirement comprises that the vehicle is within a predetermined distance or time from the final destination.

6. The method according to claim 1, wherein predicting the combustion engine shutdown is based on a next required stop of the vehicle comprising the combustion engine.

7. The method according to claim 1, wherein the predetermined requirement comprises that the vehicle comprising the combustion engine is operating in a specific mode.

8. The method according to claim 1, wherein the predetermined requirement comprises that a current temperature in the waste heat recovery system is above a critical temperature.

9. A method according to claim 1, wherein reducing the temperature in the waste heat recovery system comprises controlling the cooling circuit connected to the condenser.

10. The method according to claim 1, wherein reducing temperature in the waste heat recovery system comprises controlling the heat source connected to the at least one evaporator.

11. The method according to claim 1, wherein reducing the temperature in the waste heat recovery system comprises reducing the temperature, such that a target temperature is reached, wherein the target temperature is below a normal operation temperature.

12. The method according to claim 1, wherein monitoring further comprises monitoring both a current and an expected operation of the combustion engine associated with the waste heat recovery system.

13. A waste heat recovery system associated with a combustion engine of a vehicle, the waste heat recovery system comprising:
   a working fluid circuit;
   at least one evaporator arranged for heat exchange between a working fluid and a heat source;
   an expander;
   a condenser;
   a reservoir for a working fluid;
   a pump arranged to pump the working fluid through the working fluid circuit;
   a cooling circuit arranged in connection to the condenser; and
   a control unit including executable instructions stored in a non-transitory computer readable medium, which when executed are configured to:
      monitor, via at least one sensor, at least one of a current operation and an expected operation of the combustion engine associated with the waste heat recovery system;
      predict a future shutdown of the combustion engine, based on said monitored at least one of the current operation and the expected operation;
      determine if a predetermined requirement is fulfilled after predicting the future shutdown of the combustion engine; and if so
      reduce a temperature in the waste heat recovery system prior to combustion engine shutdown.

14. The waste heat recovery system according to claim 13, wherein the executable instructions associated with said control unit are further configured to monitor both a current and an expected operation of the combustion engine associated with the waste heat recovery system.

15. A vehicle comprising a waste heat recovery system comprising: a working fluid circuit;
   at least one evaporator arranged for heat exchange between a working fluid and a heat source;
   an expander;
   a condenser;
   a reservoir for a working fluid;
   a pump arranged to pump the working fluid through the working fluid circuit;
   a cooling circuit arranged in connection to the condenser; and
   a control unit including executable instructions stored in a non-transitory computer readable medium, which when executed are configured to:
      monitor, via at least one sensor, at least one of a current operation and an expected operation of the combustion engine associated with the waste heat recovery system;
      predict a future shutdown of the combustion engine, based on said monitored at least one of the current operation and the expected operation;
      determine if a predetermined requirement is fulfilled after predicting the future shutdown of the combustion engine; and if so
   reduce a temperature in the waste heat recovery system prior to combustion engine shutdown.

16. The vehicle according to claim 15, wherein the executable instructions associated with said control unit are further configured to monitor both a current and an expected operation of the combustion engine associated with the waste heat recovery system.

17. A computer program product comprising computer program code stored on a non-transitory computer-readable medium, said computer program code for controlling a waste heat recovery system associated with a combustion engine of a vehicle, the waste heat recovery system comprising a working fluid circuit; at least one evaporator; an expander; a condenser; a reservoir for a working fluid and a pump arranged to pump the working fluid through the working fluid circuit, wherein the at least one evaporator is arranged for heat exchange between the working fluid and a heat source, and wherein the waste heat recovery system further comprises a cooling circuit arranged in connection to the condenser, said computer program code comprising computer instructions stored on the non-transitory computer-readable medium and configured, such that when accessed and performed by at least one control unit, to execute the following operations:
   monitoring, via at least one sensor, at least one of a current operation and an expected operation of the combustion engine associated with the waste heat recovery system;
   predicting a future shutdown of the combustion engine, based on said monitored at least one of the current operation and the expected operation;
   determining if a predetermined requirement is fulfilled after predicting the future shutdown of the combustion engine; and if so
   reducing a temperature in the waste heat recovery system prior to combustion engine shutdown.

18. The computer program product according to claim 17, wherein monitoring further comprises monitoring both a current and an expected operation of the combustion engine associated with the waste heat recovery system.

* * * * *